Sept. 3, 1968  G. S. RENNIE ETAL  3,399,819
CONTAINERS FOR MOIST PRODUCTS
Filed Jan. 14, 1966
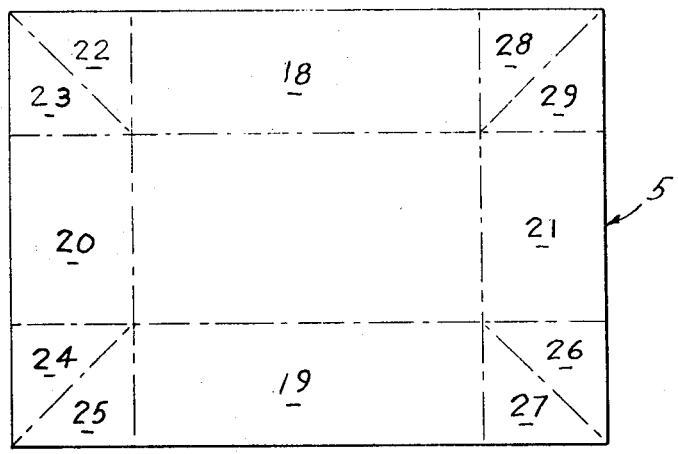
FIG.1
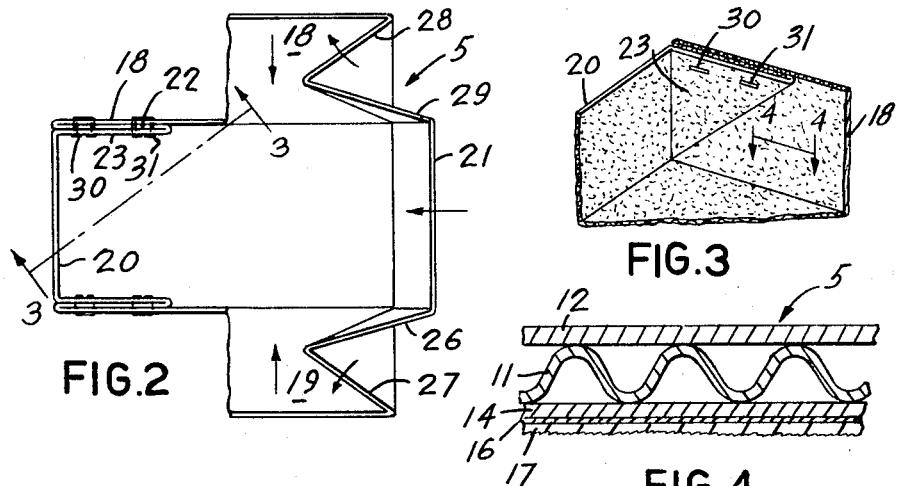
FIG.2
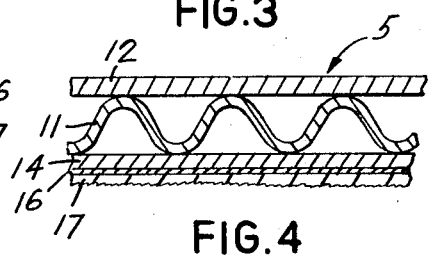
FIG.3
FIG.4
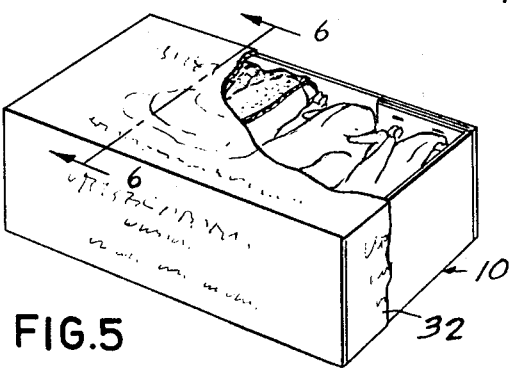
FIG.5
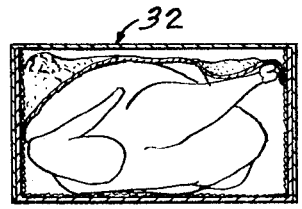
FIG.6
INVENTORS
George S. RENNIE
Leonard S. CAMPBELL
ATTORNEY

United States Patent Office 3,399,819
Patented Sept. 3, 1968

3,399,819
CONTAINERS FOR MOIST PRODUCTS
George S. Rennie, 2 Redland Crescent, Scarborough, Ontario, and Leonard S. Campbell, 5 Teal Court, Don Mills, Ontario, Canada
Filed Jan. 14, 1966, Ser. No. 520,584
23 Claims. (Cl. 229—31)

ABSTRACT OF THE DISCLOSURE

This invention relates to containers for products such as fresh eviscerated chickens, and includes a container body constructed from a pair of liners having a corrugated medium therebetween. One of the liners forms an inner surface portion of the container while another of the liners and the corrugated medium define an outer surface portion of the container. The one liner includes a layer of material capable of absorbing and retaining water and a continuous barrier layer of moisture impermeable material laminated to and between the absorbent material and the corrugated medium to prevent moisture internally of the container from reaching the corrugated medium and the other liner.

---

Many perishable products such as chickens are far better able to retain their fresh appearance (bloom) and condition during storage and shipping if they are in a moist atmosphere and this is particularly true with fresh eviscerated chickens. However, care must be taken that the moisture does not permeate the walls and bottom of the container in which the product is packed with resulting collapse of the container.

One proposed solution to the problem of maintaining the chickens or other products in a moist atmosphere has been to wrap them in a composite "blanket" consisting of a continuous moisture impermeable film and a layer or batt of highly water absorbent cellulosic fibres. The blanket is first placed in a container to line the bottom and sides of the container with the film facing outwardly and juxtaposed to the walls of the container. Parts of the blanket project upwardly out of the container and are intended to be turned in, after the container has been filled, and overlapped to form the top part of the container's lining. The batt is then wetted and the previously refrigerated product, usually chickens, is then placed on the blanket. Difficulties arise in that great care must be taken to ensure that sharp bones or wing tips do not puncture the blanket as otherwise leakage of moisture occurs which spoils the product and results in collapse of the container. In addition, the chickens must be carefully arranged in the container as otherwise difficulty is encountered in turning over the edge parts of the blanket to overlie the product, and in placing the cover or lid on the container.

It has been found in practice that however carefully the container has been packed, instances of the blanket being punctured occur, the product is spoiled and the container often collapses.

Applicants have now discovered that the shortcomings of this prior proposal can be overcome if the material from which the container itself is constructed is of laminated form and includes an inner layer of water absorbent material (intended to contact the product) and a layer of moisture impermeable material between said inner layer and those layers of container material which impart to the container its mechanical strength and rigidity.

The invention also provides a container, the lower part or tray of which is erected from a one-piece blank and which is specifically designed to be leak-proof.

The invention will now be described in detail with reference to the accompanying drawings in which:

FIGURE 1 is a plan view of a blank of foldable material suitable for erection to form the base part of a container according to the invention;

FIGURE 2 is a top plan view showing, partly folded, the blank of FIGURE 1 during the process of forming the container;

FIGURE 3 is a cross-section along the line 3—3 of FIGURE 2;

FIGURE 4 is a cross-section along the line 4—4 of FIGURE 3 through a wall of the container;

FIGURE 5 is a container according to the invention filled with chickens and closed; and FIGURE 6 is a vertical cross-section along the line 6—6 of FIGURE 5.

Container construction

Referring more particularly to FIGURE 1, the base part of the illustrated container is erected from a blank 5. The blank 5, as best illustrated in the greatly enlarged cross-section of FIGURE 4, is a corrugated board composed of corrugated medium 11 intervening a kraft paper liner 12 and an inner liner generally indicated at 13. The liner 13 consists of a kraft paper sheet 14 next to the corrugated medium 15, a synthetic resin layer 16 and a facing sheet 17 of absorbent material. The kraft paper sheets 12 and 14 are adhered to the corrugated medium 15 by water resistant starch type resin, sodium silicate, regular starch or synthetic type resin adhesives. The blank 5 is folded, as best shown in FIGURE 2, to form the body or lower part 10 of a container, panels 18 and 19 becoming side walls and panels 20 and 21 becoming end walls. Triangular corner sections 22–23, 24–25, 26–27 and 28–29 are folded inwards so that they are juxtaposed to the adjacent panel 18 or 19, and staples passed through both the triangular parts and the panel 18 or 19. Thus, as illustrated in FIGURE 3, the section 22 is juxtaposed to the panel 18 and is sandwiched between the panel 18 and the section 23. Staples 30 and 31 are passed through all three layers. This arrangement provides substantially liquid proof corners for the box.

It will be seen that the absorbent sheet 17 faces the inside of the container.

The kraft liner 12 and the corrugated medium as well as the kraft sheet 14 are moisture pervious whereas the synthetic resin layer 16 is moisture impervious.

Operation

In operation the liner sheet 17 is wetted and the moisture is available to provide a moist atmosphere for the contents of the container but cannot penetrate the layer 16 and permeate the strength imparting materials from which the container is made. That is to say, the layers 12 and 14 and the medium 11 remain dry in spite of the fact the free water exists in the container. The chickens or other perishable products are placed within the body of the container, as shown in FIGURES 5 and 6, and a cover 32 applied. The cover may be of the same composite material as the part 10 with an absorbent layer on the inside, or the cover 32 may be a conventional type of board cover, in which case a moisture impervious sheet or shroud 33 of the composite material, or of absorbent material only, is applied over the top of the product in the container and between the product and the cover. The shroud 33 is approximately 2" greater in both length and width than the container and is placed on top of the contents and tucked down between the product and the walls of the container. The container may be refrigerated if desired, but can be shipped with the chickens "fresh" and unrefrigerated.

As will be seen from FIGURES 5 and 6 the box and cover are of the "fully telescopic" type in which the box and cover walls are of about the same height.

Method of production

The material illustrated in FIGURE 4 may be produced in a number of ways. Examples are:

(1) A web of material consisting of a laminate of liner board 14 (kraft paper), polyethylene film (constituting the layer 16) and absorbent cellulosic towelling (for the layer 13) can be run into a conventional corrugator and combined with a single faced corrugated board consisting of one liner board and the corrugated medium.

(2) A web consisting of a laminate of the barrier material 16 and the absorbent material 13 can be run into the corrugator during the production of double faced corrugated board and laminated to one of the liner boards during the corrugating operation.

(3) A web consisting of a laminate of the barrier material and the absorbent material can be laminated to a previously formed double faced corrugated board.

Materials

The materials employed in the construction of the container depend on the weight of the product being packaged and upon the design of the container and it is possible to use any of the commonly employed materials. For example, the kraft paper weights could range from 17 lbs. per 1000 sq. ft. (0.005" caliper) to 95 lbs. per 1000 sq. ft. (0.024" caliper), and the corrugating medium from 17 lbs. per 1000 sq. ft. (0.005" caliper) to 36 lbs. per 1000 sq. ft. (0.012" caliper), this latter being, in practice, a reasonable upper limit.

The barrier layer 16 is preferably polyethylene film and can have a thickness of from 0.0005" to 0.005" with 0.001" as a preferred thickness. In addition, polyvinylidine chloride, polyvinyl chloride, polyvinyl chloride-acetate co-polymer, polypropylene, polyethylene co-polymer resins and wax can be employed.

A preferred material for the absorbent layer 17 is 30 lbs. per 1000 sq. ft. creped "Service Towelling." However, any fibrous material capable of wicking sufficient water from the bottom of the container so as completely to wet the walls of the container and the shroud 33 can be employed. Depending on the depth of the container absorbent tissue or paper wadding of from 10 to 60 lbs. per 3000 sq. ft. is suitable. In addition, it is possible for a thin layer of an open-celled foam material to be employed which is applied to a moisture vapour barrier film.

The shroud 33, if constituted by absorbent material only, can consist of tissue or wadding of the same quality as the layer 17. If desired the absorbent material can be laminated to a barrier layer film selected from those which are suitable for the layer 16, or to a waxed paper. If waxed paper is employed it preferably has 10–30 lbs. of wax per 3000 sq. ft. on a base sheet of 20 to 40 lbs. per 3000 sq. ft. To form the shroud 33, the absorbent material, and the waxed paper or film, can be "spot" connected by a suitable adhesive. Where absorbent material alone is employed, the cover of the box is provided with a wax layer or a water-proof film on the inner surface of that panel thereof which forms the top of the container.

If the container is to have a short shelf life the absorbent shroud can be replaced by a film or waxed paper cover.

The material used for the liner 17 is dependent on the depth of the container. Excessive wicking in a low height container causes weakening of the container and insufficient wicking results in the shroud 33 drying out, or never becoming wet, with the resultant chance of spoiling of the product.

As mentioned above, the sheet 17 is wetted before the product is placed in the container. However, it will be understood that if the product has sufficient free moisture thereon this would make pre-wetting of the liner sheet 17 unnecessary.

We claim:
1. A corrugated paper board product of the type adapted for constructing moisture-retaining containers comprising a pair of liners having corrugated medium therebetween, one of said liners being of laminated form and adapted to define an inner surface portion of a container, the other of said liners and said corrugated medium being constructed from moisture absorbent material and adapted to define an outer surface portion of a container, said one liner including a layer of material capable of absorbing and retaining water and a continuous barrier layer of moisture impermeable material laminated to the absorbent material, the moisture impermeable material being between the absorbent material and the corrugated medium and preventing moisture from the absorbent material reaching the corrugated medium, and the moisture absorbing characteristics of said last-mentioned absorbent material being substantially greater than that of said corrugated medium and said other liner.

2. The corrugated paper board product according to claim 1 in which said one liner includes a layer of paper adhered to said corrugated medium between the corrugated medium and the barrier layer.

3. The corrugated paper board product according to claim 1 in which said absorbent material is a fibrous material such as cellulose wadding having a wicking action.

4. Corrugated paper board including a pair of liners having corrugated medium therebetween, one of said liners being of laminated form and including a layer of material adapted to absorb and retain water, and a continuous barrier layer of moisture impermeable material laminated to the absorbent material, the moisture impermeable material being between the absorbent material and the corrugated medium and preventing moisture from the absorbent material reaching the corrugated medium, and in which said absorbent material is open-celled foam plastic material.

5. The corrugated paper board product according to claim 1 in which said moisture impermeable material is a film selected from polyethylene, polyvinyl chloride, polyvinyl chloride-acetate co-polymer polypropylene, polyethylene co-polymer, wax and resins.

6. The corrugated paper board product according to claim 1 in which the moisture impermeable material is polyethylene.

7. A corrugated paper board product as defined in claim 1 wherein said product is a one-piece container blank, said blank includes fold lines separating a panel adapted to form the bottom of the container from panels adapted to form the walls of the container, each end of each wall forming panel being joined to the associated end of the next wall forming panel by a panel section integral with both the wall panels that it joins, and said panel sections being adapted to be folded and overlapped whereby the walls of an erected container are devoid of any gaps through which moisture can leak.

8. The corrugated paper board product as defined in claim 7 including a pair of parallel spaced fold lines extending longitudinally of the blank and a further pair of parallel spaced fold lines extending transversely of the blank, said last-mentioned fold lines defining said bottom panel, said bottom panel being located centrally of the blank, and the remaining wall forming panels being disposed around said bottom panel and there being further fold lines extending diagonally outwardly to an edge of the blank from four corners thereof at which the transverse and longitudinal fold lines intersect.

9. The corrugated paper board product as defined in claim 7 wherein said absorbent material of said one liner is a fibrous material such as cellulose wadding having a wicking action.

10. The corrugated paper board product as defined in claim 1 wherein said product is a container defined by a substantially rectangular bottom and upstanding continuous side walls, and said container being formed from a one-piece blank of said pair of liners and said corrugated medium with the absorbent material of said one liner defining an inner surface of said container.

11. The corrugated paper board product as defined in claim 10 wherein said one liner includes a layer of paper stock material adhered to said corrugated medium between the corrugated medium and the barrier layer, and said barrier layer is in the form of an impermeable thermoplastic film laminated between said layer of paper stock material and the absorbent material of said one liner.

12. The corrugated paper board product as defined in claim 11 wherein the other of said liners includes an outermost layer of paper stock material.

13. The corrugated paper board product as defined in claim 10 wherein each end of each side wall of said container is joined to a next adjacent side wall by a panel section integral with both side walls that it joins, each panel section being rectangular in form with fold lines extending diagonally therefrom from an adjacent one of the corners of the bottom panel, and each panel section being folded along the diagonal fold lines and two adjacent triangular portions of each section being juxataposed to one another and to one of the two side walls joined thereby.

14. The corrugated paper board product as defined in claim 1 wherein said product is a closed container in which is packaged an edible food product of the type that maintains its freshness to a great extent in a moisture atmosphere, said container including a container body and a telescopic cover, said body comprising side walls, said body being erected from a one-piece blank defined by said pair of liners and said corrugated medium, the absorbent material of said one liner being disposed inwardly of said container body, said cover including a top panel and a depending peripheral wall juxtaposed to the outer surfaces of the walls of said container body and means constructed of the same material as said container body with the absorbent material layer facing inwardly into said container body.

15. The corrugated paper board product as defined in claim 14 including a blanket consisting of absorbent material overlying the product between the product and the cover.

16. The corrugated paper board product as defined in claim 15 wherein said barrier layer is a thermoplastic film.

17. The corrugated paper board product according to claim 1 in which said barrier layer is a film of moisture impermeable synthetic plastic material and in which said layer of material adapted to absorb and retain water is further adapted to spread water throughout itself by a wicking action, there being a paper sheet laminated to said plastic material between the plastic material and the corrugated medium and affixed to the corrugated medium, and a further paper sheet constituting the other liner.

18. The corrugated paper board product according to claim 17, in which said barrier layer is polyetheylene having a thickness of 0.0005" to 0.005".

19. The corrugated paper board product according to claim 18, in which the polyethylene has a thickness of about 0.001".

20. The corrugated paper board product according to claim 17, in which said paper sheets are each of kraft paper of between 0.005" and 0.024" caliper.

21. The corrugated paper board product according to claim 17, in which the corrugated medium is 0.005" to 0.012" caliper board material.

22. The corrugated paper board product according to claim 17, in which the absorbent layer is 30 lbs. per 1000 sq. ft. creped towelling.

23. The corrugated paper board product according to claim 17, in which the absorbent layer is paper wadding of from 10 to 60 lbs. per 3000 sq. ft.

References Cited

UNITED STATES PATENTS

| | | | |
|---|---|---|---|
| 1,561,471 | 11/1925 | Kress | 161—137 |
| 2,792,165 | 5/1957 | Thompson | 229—31 |
| 2,912,152 | 11/1959 | White | 229—3.1 |
| 3,088,646 | 5/1963 | Jacke | 229—14 |
| 3,231,171 | 1/1966 | Weiss | 229—31 |
| 3,067,923 | 12/1962 | Thiets | 229—14 |

JOSEPH R. LECLAIR, *Primary Examiner.*

R. PESHOCK, *Assistant Examiner.*